United States Patent [19]

Curran et al.

[11] Patent Number: 4,524,615

[45] Date of Patent: Jun. 25, 1985

[54] METHOD AND SYSTEM FOR MEASURING THE SPEED OF A SHIP

[75] Inventors: Paul F. Curran; Hubert T. Marshall, II, both of Fishkill, N.Y.

[73] Assignee: Texaco Inc., White Plains, N.Y.

[21] Appl. No.: 527,585

[22] Filed: Aug. 29, 1983

[51] Int. Cl.³ ............................................. G01C 21/10
[52] U.S. Cl. ..................................................... 73/181
[58] Field of Search ................. 73/181, 178 R, 170 A; 364/565

[56] References Cited

FOREIGN PATENT DOCUMENTS 716722 2/1942 Fed. Rep. of Germany ........ 73/181

Primary Examiner—Donald O. Woodiel
Attorney, Agent, or Firm—Robert A. Kulason; Henry C. Dearborn

[57] ABSTRACT

A single scope method or system for accurate ship speed measurement relative to the water through which it is propelled. There is a free floating buoy beside the ship, and a tracking scope is trained on the buoy. At the same time the height above the water of the scope is measured in addition to the negative elevation and the azimuth angle of the line of sight of the scope relative to the ship. Periodic calculations with time measurements determines the speed of relative movement of the buoy along a path parallel to the center line of the ship. This is the ships speed relative to the water. Calculations may be made by a microprocessor with the measured angles and height above the water as inputs.

11 Claims, 6 Drawing Figures

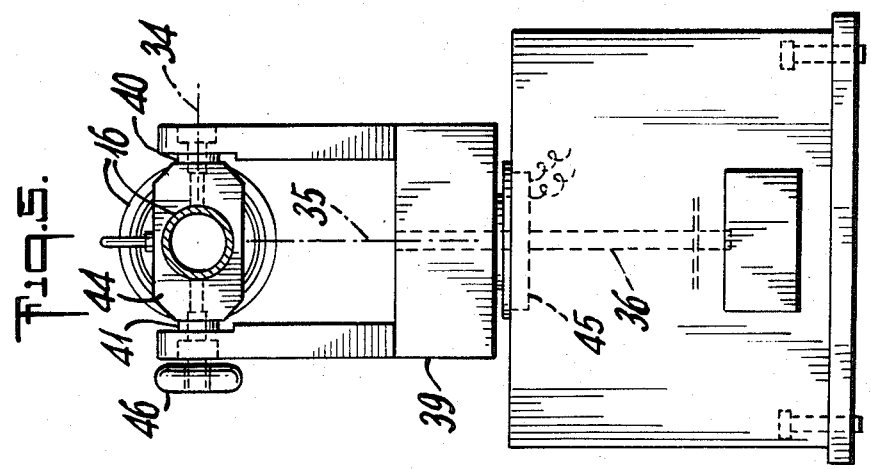
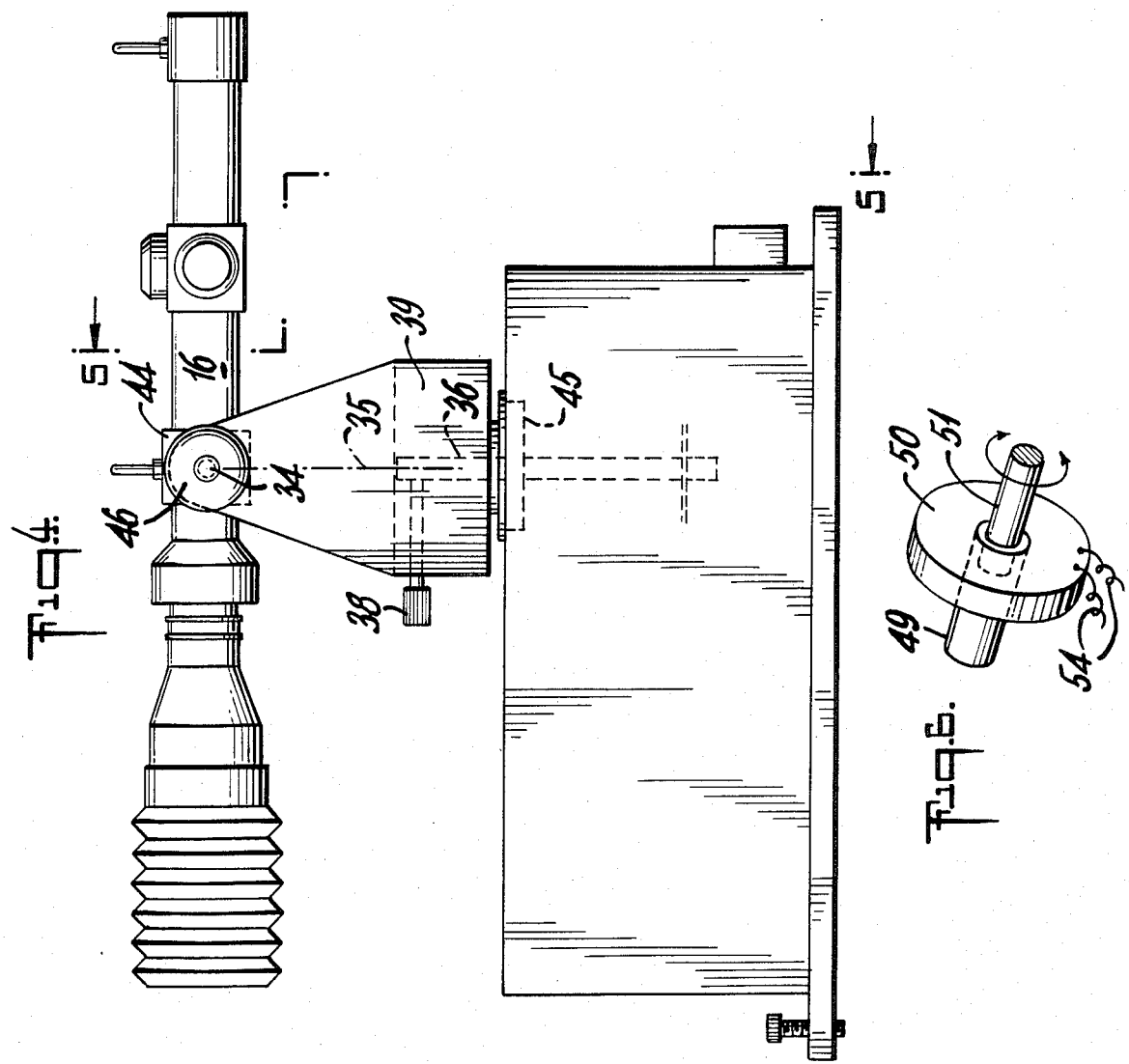

METHOD AND SYSTEM FOR MEASURING THE SPEED OF A SHIP

FIELD OF THE INVENTION

This invention concerns measurement of ship speed, in general. More specifically, it deals with a method and apparatus for measuring accurately the speed of a ship relative to the water through which it is traveling.

BACKGROUND OF THE INVENTION

The performance of a ship particularly with regard to fuel efficiency has become a major consideration because of the current high fuel costs. While ship navigation systems may yield the ships speed across the earths surface, they do not account for effects of ocean currents. Consequently, such navigation cannot be used to determine the ship's propulsion efficiency.

As a ships hull condition deteriorates due to marine growth, bottom paint failure and other factors, the speed of a ship through the water diminishes for a given propulsion power. Thus more power is required to maintain speed or without more power the time at sea is increased. In either case, more fuel is consumed per voyage. In order to monitor conditions so that correction action may be taken at the most efficient time, a measure of the hull efficiency may be determined by measuring the speed of the ship through the water at a standard propulsion power. However, while a number of techniques for measurement of ships speed through the water have been used over the many years by mariners, such techniques have either lacked sufficient accuracy to evaluate hull efficiency or they have required undesirable instrumentation installations aboard ship.

Consequently, it is an object of this invention to provide a means for accurately determining the speed of a ship relative to the water through which it travels. And, the means employs instrumentation that does not require extensive shipboard installation.

Another object of the invention is to measure the speed of a ship relative to a body of water through which it moves, in a highly accurate manner.

SUMMARY OF THE INVENTION

Briefly, the invention relates to a method of measuring a speed of a ship relative to a body of water through which it is being propelled. It comprises the steps of placing a free floating buoy on said body of water beside said ship, and tracking said buoy from a location on said ship above the surface of said body of water. It also comprises measuring the height of said location above said water surface during said tracking, and measuring the vertical angle at said location between the horizontal and said target during said tracking. It also comprises the steps of measuring the horizontal angle at said location between a plane parallel to the center line of said ship and said target during said tracking, and periodically calculating the relative position of said buoy along a line parallel to the center line of said ship whereby said speed may be determined.

Again, briefly, the invention relates to a system for measuring the speed of a ship relative to a body of water through which it is being propelled. The system comprises a free floating buoy on said body of water beside said ship, and a scope located on said ship above the surface of said body of water for tracking said buoy. It also comprises means for measuring the height of said scope above said water surface, and means for measuring the vertical angle of said scope while tracking said buoy. It also comprises means for measuring the horizontal angle of said scope while tracking said buoy, and means for timing said measurements whereby the speed of said ship relative to said body of water may be determined.

Once more briefly, the invention concerns a system for measuring the speed of a ship relative to a body of water through which it is being propelled. The system comprises a free floating buoy on said body of water beside said ship, and a scope having a line of sight being located on said ship above the surface of said body of water for tracking said buoy. It also comprises a range finder means for measuring the height of said scope above said water surface, and mounting means for said scope to permit rotation about vertical and horizontal axes both transverse to said line of sight. It also comprises first and second transducer means associated with said vertical and horizontal axes for measuring the azimuth and elevation angles of said line of sight, and microprocessing means for receiving signals from said first and second transducer means and from said range finder means for periodically determining the relative position of said buoy along a path parallel to said ship whereby said ship speed is accurately measured.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 4 is an enlarged side elevation of a typical scope with mounting to permit rotation about horizontal and vertical axes;

FIG. 5 is an end elevation view of the scope illustrated in FIG. 4; and

FIG. 6 is a schematic perspective illustration, showing a typical structural arrangement for each of a pair of rotary transducers that are employed with the scope mountings of FIGS. 4 and 5.

DESCRIPTION OF THE PREFERRED EMBODIMENTS

Figure 1:
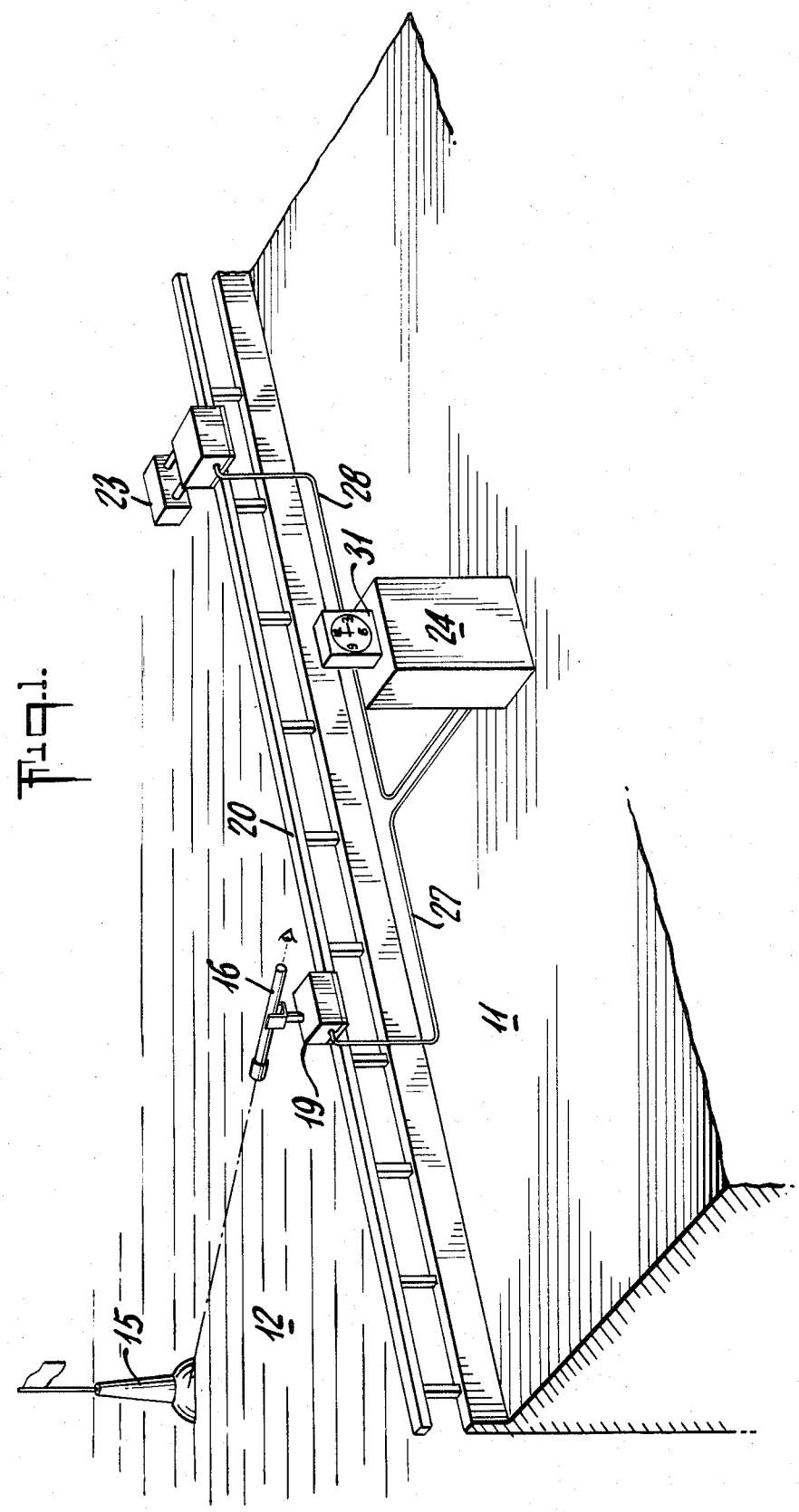
FIG. 1 is a schematic in perspective showing a scope and related elements on the side of a ship with a free floating buoy on the body of water nearby.

The FIG. 1 schematic indicates the basic elements that are involved in this invention. Thus, there is a ship 11 that is being propelled through a body of water 12 upon which the ship floats. There is a free floating buoy 15 located beside the ship 11. The buoy 15 will have been placed on the body of water 12 so that it floats freely beside the ship and in view of a tracking scope 16. The scope 16 is mounted in any convenient location on the ship such that the buoy 15 may be tracked by viewing through the scope 16. The scope 16 is mounted on a base 19 so as to permit free rotation about both a horizontal and a vertical axis. The base 19 is securely mounted on a rail 20 of the ship 11. And, there is an altimeter, or range finder means 23 that is also mounted on the rail 20 for measuring the height of the scope 16 above the surface of the body of water 12. Also, there is a microprocessor 24 that is located wherever convenient aboard the ship 11. There are electrical connections 27 and 28 for providing signals from the scope 16 and from the altimeter or range finder 23, respectively. Additionally, there is clock 31 that is schematically indicated and located on top of the microprocessor 24. It will be understood as the description proceeds that the timing element need not be a clock per se but may be incorporated in the microprocessor itself.

Figure 2:
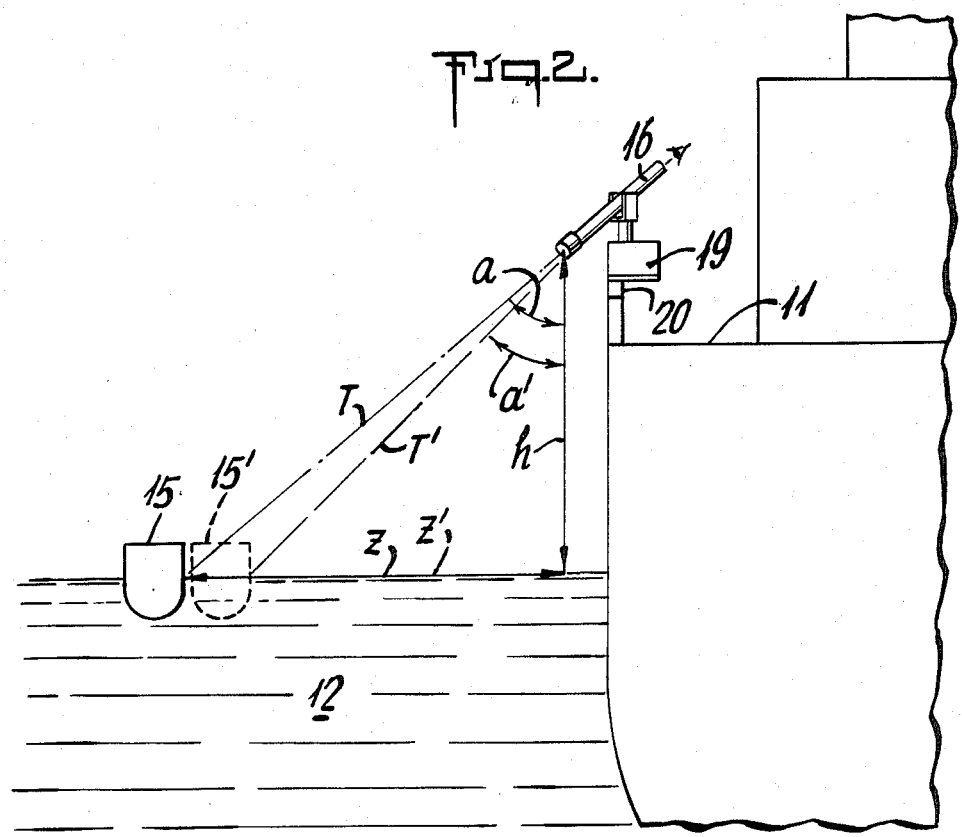
FIG. 2 is a schematic representation of the ship that is indicated in FIG. 1, with scope mounted on the railing and the free floating buoy along side.
Figure 3:
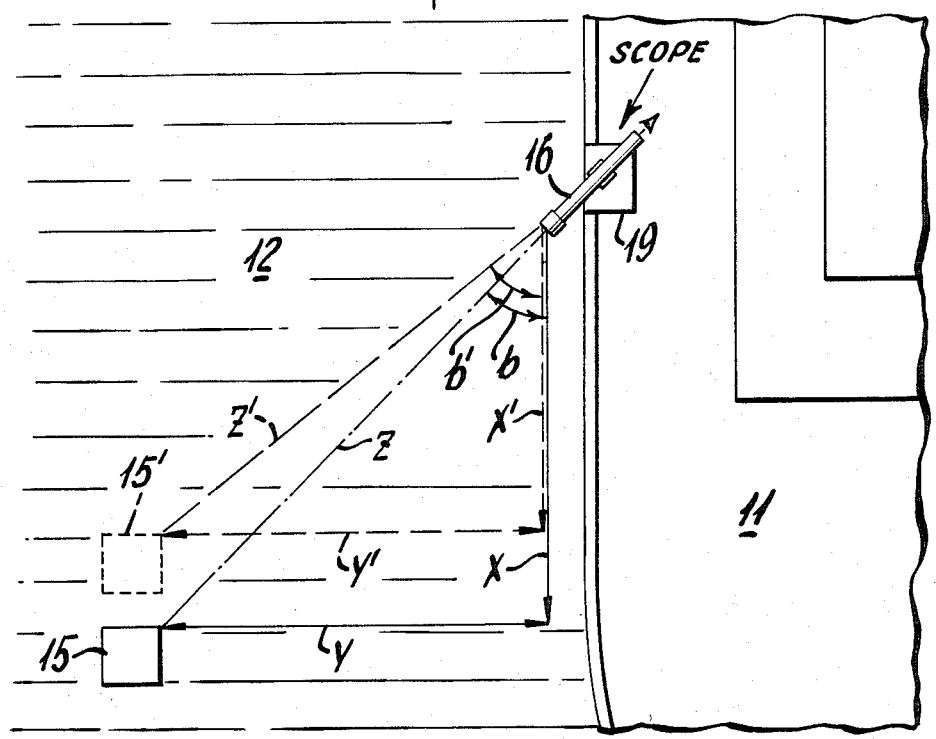
FIG. 3 is a schematic plan view representation of the ship and the free floating buoy, plus the scope mounted on the railing of the ship, all similarly as in FIG. 2.

The speed measurement of the ship 11 will be understood from the following description which relates to the schematic diagram of FIGS. 2 and 3. It should be understood that the FIG. 2 schematic indicates a the measurement of a height h above the surface of the body of water 12. This is accomplished by the range finder or altimeter 23 which was indicated in FIG. 1. While the diagram indicates the h measurement to be at the end of the scope 16, this is schematic only and the measurement will be effectively at the pivot point for the scope 16.

In addition, it must be understood that the schematic diagram of FIG. 2 illustrates the angles and measurements which are taken on a vertical plane that passes through the target and the pivot point of the scope. Thus, at a given sighting during the tracking by the scope 16, i.e. when its line of sight intercepts the buoy 15, the angle a is measured at the scope's pivot. Then the horizontal distance Z from the scope 16 to the buoy 15 may be calculated using the height h and the angle a.

Simultaneously the horizontal angle of the scope 16 (relative to the center line of the ship 11) is measured. This is indicated by the schematic illustration of FIG. 3. The angle b is measured and used with the calculated distance Z (described above) to calculate the horizontal measurement of a distance X. Here again, it will be understood that the diagram indicated is schematic only and the angles and measurements that are shown from the end of the scope 16 are effectively representative of the angles and distances from the pivot point of the scope 16. Thus, for example the distance Y of the position of the buoy 15 is taken transversely to the center line of the ship 11, and the distance X is horizontal and lies in a vertical plane passing through the pivot point of the scope 16, which plane lies parallel to the center line of the ship.

After the calculations indicated above, which were to determine a measurement X for the relative position of the buoy at that instant, the tracking of the buoy 15 (by the scope 16) is continued. Then, after an interval of time, delta t, the same measurement of the angles a and b and the height h will be carried out again. Consequently (as indicated in the diagrams of FIGS. 2 and 3) a new dimension Z' will be calculated with the buoy 15 in its new positions 15', as indicated by the dashed line showings. Simultaneously, the horizontal angle measurement b' will be carried out using the new distance Z' to obtain a new measurement X' of the relative position of the buoy 15'. And after the new measurement has been accomplished, the difference between the previous measurement of the distance X and the new measurement of the distance X' represents the relative movement of the ship 11 through the body of water 12 during the time interval delta t. Consequently the speed of the ship 11 is measured, it being the distance delta X (X—X') divided by the time delta t.

It will be understood that by employing the microprocessor 24, the calculations indicated above may be carried out substantially instantaneously and the time measurement may be incorporated with the microprocessor so that the distance of travel and the speed measurement itself will be periodically determined.

It may be noted that while the FIG. 2 schematic gives the impression of its being a transverse cross-sectional view, this is not strictly the case. Rather, the FIG. 2 schematic indicates the dimensions which are taken on a plane that is vertical and passes through the buoy 15 as well as the pivot point of the scope 16. That is why the buoy shown at position 15' appears to be closer to the ship 11. It is the distance Z' which has become shorter.

FIGS. 4 and 5 illustrate a typical mounting for the scope 16. It is pivoted about a horizontal axis 34 and a vertical axis 35 which latter is the axis of a vertical shaft 36. A yoke 39 is mounted on the shaft 36 for rotation therewith when a set screw 38 is tightened.

The horizontal axis 34 is the axis of a pair of aligned pivot pins or shafts 40 and 41, one on each side of a clamp 44 that holds the scope 16.

There are two transducers 45 and 46 for measuring the horizontal angular position and the vertical angular position respectively of the line of sight of the scope 16. These transducers may take various forms and are chosen to be compatible with the microprocessor 24.

It will be understood that the physical form of these transducers might vary and a schematic indication is illustrated in FIG. 6. There is a mounting shaft 49 to which a rotary transducer element 50 is securely attached. A rotatable shaft 51 carries an element or elements (not shown) that cooperate with the rotary transducer 50 so as to produce an electrical signal that is transmitted via the electrical leads 54 that are illustrated.

A method according to this invention measures the speed of a ship relative to a body of water through which it is being propelled. The following steps of such a method may be carried out using any feasible apparatus to accomplish them. A first step is that of placing a free floating buoy on the body of water beside the ship. It will be understood that the buoy must be within sight of the ship since it is to be tracked in accordance with other steps of the procedure.

A next step is that of tracking the buoy from a location on the ship that is above the surface of the body of water. Such tracking is carried out using any feasible means, for example a scope that is mounted for free rotation about both a vertical and horizontal axis.

A next step is that of measuring the height of the location of the tracking point above the water surface during the tracking. This height measurement may be carried out with any feasible instrument, or otherwise so long as it make a precise determination of the height of the tracking point above the water surface.

A next step is the measuring of the vertical angle (at the tracking location) between the horizontal and the target, i.e. the buoy, during said tracking. When a scope is used for the tracking, the verticle angle is that between the scope when in a horizontal position and the scope when directed toward the buoy Consequently, it is a negative angle of elevation which is measured.

A next step is the measuring of the horizontal angle at the sighting location, which is the angle between a plane parallel to the center line of the ship and a plane through the sighting location and the target. It will be understood that this angle would be that taken from the action of a scope if it is the tracking instrument. Thus the angle is that between the scope when it is in a fore and aft position (parallel to the center line of the ship) and when it is sighting onto the buoy during the tracking.

A final step is that of periodically calculating the relative position of the buoy with respect to the ship as the buoy moves along a line parallel to the center line of the ship. After such periodic calculations, by including the time required to change position from one point to the next, the speed of the ship is accurately determined.

It will be appreciated that the final step of calculation would be most feasibly carried out with the required accuracy by employing the above described microprocessor 24 or its equivalent. It receives signals from the transducers 45 and 46 associated with the scope 16. And it also receives signals from the instrument 23 that measures the height of the scope above the water. And in addition, it includes a time measurement that is included with the indicated calculations so as to make periodic determinations of the travel of the ship through the body of water, directly. The speed of travel that is measured is along the center line of the ship and so it will provide the accurate speed measurement desired.

The various instruments that have been described above may be ones that are available from various sources, so long as they may be included in the system for carrying out the invention in a compatible manner. Thus, there are numerous manufacturers which market devices that may be used as the rotary position transducers, e.g., like that which is schematically illustrated and described in connection with FIG. 6. For example, the Computer Conversions Corporation of Northport, N.Y. offers a rotary transducer device with a claimed accuracy of one part per 100,000. Similarly, Dynamics Research Corporation of Wilmington, Mass. offers a similar product, and there are numerous other firms.

In regard to the measurement of the height h (indicated in the schematic diagram of FIG. 2) it will be appreciated that several measurement concepts could be utilized for this determination. It would be feasible to employ either sonar or laser range finders for the purpose, and Polaroid markets a sonic distance meter while Hewlett-Packard manufactures a laser range finder.

The microprocessor 24 may be any feasible one, e.g. one of those available from a number of different brand manufacturers. For example Micro/Sys of La Canada, Calif. and Motorola of Phoenix, Ariz. are two such manufacturers. It will be understood that the microprocessor 24 receives input data via signals that are developed by the rotary position transducers 43 and 46 as well as signals from measuring the height h, which latter signals are developed by the altimeter (or range finder) 23. The microprocessor 24 goes through a preprogrammed sequence of steps so as to carry out the calculations and display the speed in accordance with the foregoing explanations.

It will also be understood that the scope 16 might take various forms. For example, it might be one like a rifle scope, e.g. a scope manufactured by Redfield, Inc. of Denver, Colo. Of course, some modification of the scope housing and its mounting is carried out, as indicated by the above descriptions. In particular, some structural accommodation is made with the pivots for the horizontal and vertical axes in order to the have the two rotary position transducers 46 and 45 mounted so as to produce the desired signals.

The procedure which is carried out by the microprocessor 24 involves the performance of calculations based on sets of four inputs. From such calculations a determination of the speed of the ship is obtained. An example of the sequence of calculations is as follows. (1) The microprocessor 24 receives four measurements, i.e. the vertical angle a, the horizontal angle b, the elevation h and the time t. (2) Based upon precalibration of the transducers 45 and 46, the values of the horizontal and vertical angles are converted to degrees. (3) The horizontal distance Z, in a plane through the crossing of the vertical and horizontal axes of the scope 16 and the buoy 15, is calculated from the geometrical relationship $Z = h \tan a$. (4) The horizontal distance Y, in a plane through the buoy 15 that is transverse to the center line of the ship 11, as well as the horizontal distance X, in a plane through the crossing of the vertical and horizontal axes of the scope 16 that is parallel to the center line of the ship 11, are both calculated from the geometrical relationships: $X = Z \cos b$ and $Y = Z \sin b$. It will be noted that the value of Y should remain constant since the only relative motion between the buoy 15 and the ship 11 is caused by the ship's forward movement in the X direction. (5) Once the step (4) is complete the microprocessor 24 stores the values t, X and Y for each measurement. (6) By comparing the change in X values to the elapsed time between calculations of each X value, the ship's forward velocity is measured in accordance with the relationship $V_x = \Delta X/\Delta t$ where $V_x$ is the velocity at the end of each time interval. Consequently an array of velocity value for the ship 11 relative to the body of water 12 is obtained.

It may be noted that the reliability of the procedure can be checked in two ways. First, the sum of all changes in the values of Y should equal zero or there is a source of error in the speed being measured. Second, the microprocessor 24 can be programmed so that a series of $V_x$ measurements are retained with a statistical mean and variance calculated. If the variance is greater than a specified limit there is some error in the procedure.

While particular embodiments according to the invention have been described above in considerable detail in accordance with the applicable statutes, this is not to be taken as in any way limiting the invention but merely as being descriptive thereof.

We claim:
1. Method of measuring speed of a ship relative to a body of water through which it is being propelled, comprising the steps of:
   placing a free floating buoy on said body of water beside said ship,
   tracking said buoy from a location on said ship above the surface of said body of water,
   measuring the height of said location above said water surface during said tracking,
   measuring the vertical angle at said location between the horizontal and said buoy during said tracking,
   measuring the horizontal angle at said location between a plane parallel to the center line of said ship and said buoy during said tracking, and
   periodically calculating the relative position X of said buoy along a line parallel to the center line of said ship and determining elapsed time $\Delta t$ between said periodical calculations whereby said speed may be determined from the relationship $V_x = \Delta X/\Delta t$ where $V_x$ is the velocity at the end of said elapsed time.

2. Method according to claim 1, wherein said step of placing a free floating buoy, comprises:
throwing said buoy from the forward deck of said ship far enough out to be sighted along the length of said ship.

3. Method according to claim 2, wherein said step of throwing is on the leeward side of said ship.

4. System for measuring the speed of a ship relative to a body of water through which it is being propelled, comprising:
a free floating buoy on said body of water beside said ship,
a scope located on said ship above the surface of said body of water for tracking said buoy,
means for measuring the height of said scope above sad water surface,
means for measuring the vertical angle of said scope while tracking said buoy,
means for measuring the horizontal angle of said scope while tracking said buoy, and
means for timing said measurements whereby said measurements may be used to calculate the relative position of said buoy along a line parallel to the center line of said ship at periodic intervals in order that the speed of said ship relative to said body of water may be determined.

5. System for measuring the speed of a ship, according to claim 4, wherein:
said means for timing comprises (b) rotary transducer means associated with said means for measuring the vertical and horizontal angles, (b) electric signal means for representing said height of the scope, and (c) computer means for receiving outputs from said electric signal means and said rotary transducer means and determining the relative position of said buoy along a path parallel to the center line of said ship at measured intervals of time.

6. System for measuring the speed of a ship according to claim 5, wherein said free floating buoy is on the leeward side of said ship to minimize wind effects on said buoy.

7. System for measuring the speed of a ship according to claim 5, wherein said vertical angle is elevation, and said horizontal angle is azimuth.

8. System for measuring the speed of a ship, according to claim 7, wherein said computer means is a microprocessor.

9. System for measuring the speed of a ship, according to claim 4, wherein said free floating buoy is on the leeward side of said ship to minimize wind effects on said buoy.

10. System for measuring the speed of a ship according to claim 4, wherein said vertical angle is elevation, and said horizontal angle is azimuth.

11. System for measuring the speed of a ship relative to a body of water through which it is being propelled, comprising:
a free floating buoy on said body of water beside said ship,
a scope having a line of sight and being located on said ship above the surface of said body of water for tracking said buoy,
range finder means for measuring the height of said scope above said water surface,
mounting means for said scope to permit rotation about vertical and horizontal axes both transverse to said line of sight, first and second transducer means associated with said vertical and horizontal axes for measuring the azimuth and elevation angles of said line of sight, and
microprocessing means for receiving signals from said first and second transducer means and from said range finder means for periodically determining the relative position of said buoy along a path parallel to said ship whereby said ship speed may be accurately measured.

* * * * *